United States Patent Office 2,728,653
Patented Dec. 27, 1955

2,728,653

TETRAHYDROFURFURYL ESTER OF 4-CHLORO-2-METHYLPHENOXYACETIC ACID

Robert C. Scott, Pittsburgh, Pa., assignor to Pittsburgh Coke & Chemical Company, Pittsburgh, Pa., a corporation of Pennsylvania No Drawing. Application May 1, 1951,
Serial No. 224,069

5 Claims. (Cl. 71—2.5)

This invention relates to certain new esters of tetrahydrofurfuryl alcohol with specific aryloxyacetic acids, to herbicidal compositions containing such esters as the essential active ingredient, to the control of weeds and other plants by the use of such esters and herbicidal compositions and to processes for manufacture of these new esters.

FIELD OF INVENTION

In the past few years, certain of the aryloxy acetic acids or their salts or esters, such as 2,4-dichlorophenoxyacetic acid, have come into prominence as herbicides for the selective control of broad leaf weeds in narrow leaf grains and certain other crop or ornamental plants. They have also found extensive use in destroying woody perennial weeds or brush along railroads, electric and telephone right of ways, and for killing brush in general.

Many of these aryloxyacetic acid derivatives have been found to possess good selective weed killing properties and their use has been adopted on a wide scale. However, their selective nature is not as great as desirable for all types of uses. At the same time, another serious disadvantage has been experienced in connection with their use. Thus, when the compounds have been used as herbicides, there has been a tendency for the material to damage or kill desirable vegetation adjacent the areas to which the herbicides were applied, due to vapor drift or volatilization. Accordingly, attempts have been made to correct this volatility disadvantage through the provision of new salts or esters of the aryloxyacetic acids.

There are still other disadvantages which have been experienced in connection with this general type of material. Thus, some of the esters which have been developed in the past from the herbicidal acids have exhibited low volatility properties, but have been impractical for use in the formation of commercial herbicides because they are not liquid, except at high temperatures, they are too insoluble in commercial solvents or the acid equivalency of the ester is poor.

OBJECTS

A principal object of this invention is the provision of new tetrahydrofurfuryl esters of certain aryloxyacetic acids. Further objects include:

1. The provision of new esters having pronounced selective herbicidal properties.
2. The provision of such esters which have very low vapor pressure while, at the same time, have a relatively high acid equivalency.
3. The provision of new herbicidal compositions which may be used safely with little vapor drift to neighboring crops and which may be used without causing any appreciable damage or injury to desirable vegetation growing in adjacent areas to which the esters are applied.
4. The provision of a number of herbicidal esters which are normally liquid although they have low volatility.
5. The provision of herbicidal esters having low vapor pressures which are readily soluble in organic solvents and can be made into formulations which can be easily dispersed in aqueous media or the like.
6. The provision of new brush killing compositions.
7. The provision of new procedures for selective killing of weeds without damage to neighboring vegetation due to vapor drift or the like.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by the provision of new tetrahydrofurfuryl-alcohol esters having the general formula:

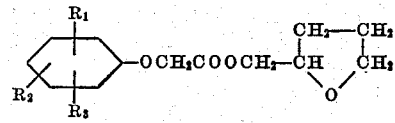

wherein $R_1$ is a radical selected from the group consisting of hydrogen, halogen and lower alkyl, $R_2$ is a halogen radical and $R_3$ is a radical from the group consisting of halogen, and lower alkyl.

Such esters are compounded with solvents, extenders, wetting agents, other herbicidal materials or the like, to form new herbicidal compositions. Such compositions are applied to weeds for the selective destruction of the weeds among narrow leaf grains or similar crops upon which the esters have no phytocidal effect, for the control of brush and similar uses.

The success of the present invention is due to a large extent to the discovery that the tetrahydrofurfuryl alcohol esters of known aryloxyacetic acids, as defined by the formula given above, have unusually low volatility, are highly selective in herbicidal properties and, at the same time, have a relatively high acid equivalency. Consequently, it has been found that these specific esters are unusually well adapted for use as herbicides or for the formation of herbicidal compositions.

EXAMPLES

A more complete understanding of the new products and compositions of this invention may be had by reference to the following illustrative examples of actual operations in accordance with the invention.

Example 1

This example illustrates the formation of the tetrahydrofurfurylalcohol ester of 2,4,5-trichlorophenoxyacetic acid.

A mixture of 255.5 grams (1.0 mole) of 2,4,5-trichlorophenoxyacetic acid, 112.3 grams (1.0 mole plus 10% excess) of tetrahydrofurfurylalcohol, 0.6 ml. of concentrated sulfuric acid, and 75 ml. of benzene were heated at reflux with stirring for three hours. The apparatus was equipped with a water trap so that the refluxing benzene could be returned to the reaction flask and the water withdrawn. At the end of this time, the organic acid content was 1.14% (determined by titration). The mixture was extracted by shaking thoroughly with 200 ml. of 0.5% sodium hydroxide and then twice with about 200 ml. of water. After separation, the material was heated to about 80° C. under reduced pressure (aspirator). The yield was 91%. Analysis: 99.5% tetrahydrofurfuryl 2,4,5-trichlorophenoxyacetate; 0.3% 2,4,5-trichlorophenoxyacetic acid. The melting point is 46 to 48° C.; it has a boiling point of 188° C. at 0.5 mm. pressure and is immiscible with water, but soluble in most of the common organic solvents.

Example 2

This example illustrates the production of the tetrahydrofurfurylalcohol ester of 2,4-dichlorophenoxyacetic acid.

In an apparatus similar to that described in Example 1, 221 grams (1.0 mole) of 2,4-dichlorophenoxyacetic acid, 112.3 grams (1.0 mole plus 10% excess) of tetrahydrofurfuryl alcohol, 0.6 ml. of concentrated sulfuric acid and 75 ml. of benzene were heated under reflux until the free 2,4-dichlorophenoxyacetic acid content was down to 2.3%. The material was treated as above and vacuum distilled. The yield was 88%. Analysis: 98.9% tetrahydrofurfuryl 2,4-dichlorophenoxyacetate; 0.27% 2,4-dichlorophenoxyacetic acid. The refractive index ($n/D$) at 20° D is 1.4520, it has a boiling point of 170° C. at 0.5 mm. pressure and is immiscible with water, but soluble in most common organic solvents.

Example 3

This example illustrates the production of a herbicidal composition comprising the ester of Example 2.

A herbicidal composition is made up of the following ingredients:

Concentrate I

| Ingredient: | Percent by weight |
| --- | --- |
| Ester of Example 2 | 49.4 |
| Emulsifying agent | 6.0 |
| High boiling naphtha | 54.6 |

The herbicidal composition is prepared by dissolving the ester in the naphtha and then adding to this the wetting agent. The mixing may be conducted at room temperature, i. e., 18° C. The concentrate is a free-flowing liquid easily dispersible in water and remains a free-flowing liquid even at temperatures below 0° C.

Example 4

A herbicidal composition which may be formed into an aqueous spray using even very hard water is made up of the following ingredients:

Concentrate II

| Ingredient: | Percent by weight |
| --- | --- |
| Ester of Example 1 | 49.4 |
| Emulsifying agent | 6.0 |
| Sequestering agent (citric acid) | 0.5 |
| High boiling naphtha | 54.1 |

Example 5

This example illustrates the formation of a "brush-control" concentrate from the esters of Examples 1 and 2.

A composition is made up by mixing together the following ingredients:

Concentrate III

| Ingredient: | Percent by weight |
| --- | --- |
| Ester of Example 1 | 28.8 |
| Ester of Example 2 | 27.8 |
| Emulsifying agent | 7.0 |
| High boiling naphtha | 36.4 |

The concentrate is a free-flowing liquid at normal temperatures which is easily mixed with water to form a uniform emulsion. For use in control of brush, it is mixed generally with from one to 10 quarts for each 100 gallons of water.

It may also be diluted with diesel or fuel oils and this mixture used as a spray, e. g., 1 to 6 gallons of the concentrate to about 20 gallons of oil.

DETAILED DESCRIPTION

An essential component of the new esters is tetrahydrofurfuryl alcohol. When used in making the esters, it may be of very high purity, but commercial types of the alcohol, containing minor percentages of related alcohols and other organic products may be used without disadvantage.

Especially desirable new esters are those from 2,4-dichlorophenoxy; 2,4,5-trichlorophenoxy, and 4-chloro-2-methylphenoxyacetic acids. However, the tetrahydrofurfuryl esters of other aryloxyacetic acids included within the general formula indicated above have been found to be useful in accordance with the invention. Examples of other acids include: 2-chloro-4-propyl; 2-ethyl-4-chloro; 2,4-dichloro-6-iodo; 2-chloro-4-bromo; 2-chloro-4,5-dibromo; 2,4-dibromo; 2,4,5-tribromo; 2-methyl-4-bromo, and similar substituted phenoxyacetic acids.

The method used in preparing the esters is not critical and most procedures known to be useful for this purpose may be employed, although, some procedures produce higher yields and better products than others. The preferred method is to mix an excess of the alcohol with a quantity of the aryloxyacetic acid and a dehydration catalyst, e. g., sulfuric acid, phosphoric acid, alumina, or the like, and then remove water produced by the esterification as it is formed. Preferably, the water removal is by azeotropic distillation with a solvent, such as benzene or toluene.

The temperature of the esterification can be varied and will depend, to a large extent, upon the exact procedure used, e. g., the quantity and nature of a solvent added as an azeotrope, if used. The preferred temperature range has been found to be between 100 and 150° C.

The time of reaction, necessary for complete removal of the water and completion of the reaction, depends upon the temperature employed as well as the procedure used in its removal. Generally, it may be varied from about 2 to 12 hours. The total time for the esterification also depends to some extent on the type and quantity of condensation catalyst used. Neither the quantity nor type of catalyst have been found to be critical, although sulfuric acid is preferred as the catalyst and this is generally employed in a quantity of about 0.1 to 1% of the total reaction mixture.

The desired ester can be separated by various means, the preferable method being vacuum distillation which is generally applied subsequent to neutralization of the reaction mixture with a base, such as sodium hydroxide, and extraction with water to remove unreacted acids, salts, or the like. However, separation of the product from the reaction mixture is not essential and suitable herbicidal compositions can be made from the reaction mixture as obtained or following neutralization, washing, or the like.

The formation of herbicidal compositions from the new esters can proceed generally along the lines which have become established for this type of product. Thus, they may be mixed with emulsifying agents, such as polyethylene hexitan esters of mixed fatty or resin acids, e. g., polyethylene glycol sorbitan oleate; long chain alkyl sulfates, e. g., sodium lauryl sulfate; organic sulfonates, e. g., tertiary butyl naphthalene sodium sulfonate, or mahogany soap; fatty acid soaps, e. g., sodium oleate, and similar ionic and non-ionic wetting or emulsifying agents.

In preparing the herbicide compositions, the esters of this invention may be mixed with one another or with other herbicidal materials, such as other esters or salts of aryloxyacetic acids, inorganic arsenates, or similar inorganic or organic herbicidal materials.

The new esters may be compounded as solutions in suitable solvents, such as ketones, e. g., acetone, esters, high-boiling petroleum naphtha, or other hydrocarbon oils. Cosolvents, spreading agents, adhesives, or the like, may be employed in formulating herbicidal concentrates, sprays or the like from the new esters. Similarly, if desired, the herbicidal esters may be compounded as dusts with various finely divided solid carriers, such as calcium carbonate, bentonite, kieselguhr, fuller's earth, talc, or the like, the esters being present generally from one to 10% by weight of the dust.

Also useful in forming the herbicidal products are ion sequestering agents, such as ethylene diamine tetraacetic, citric or glycollic acids, or the like, particularly, where the products are to be used in forming sprays with hard water. Concentrates for herbicidal spray use incorporating the esters in 5 to 95%, particularly 25 to 65% by weight thereof are valuable products.

Generally, in use an emulsion spray of the esters is made up to contain the acid equivalent of about 0.1 to 0.2%. Oil-base sprays are generally higher in concentration of active herbicide, e. g., 1 to 6 gallons of concentrate to 20 gallons of oil. Such dosages are only approximate and will be varied to fit the plant and season of the year.

SUMMARY

The invention as described above provides new aryloxyacetic acid esters of tetrahydrofurfuryl alcohol. These esters have been found to be unusually useful as herbicidal materials, because of a high selectivity for broad leaf weeds, low volatility, and at the same time a relatively high acid equivalency. In addition, they are soluble in a large variety of solvents or can be easily formulated into concentrates that may be formed into suspensions or emulsions. Through the use of these new esters and herbicidal compositions made therefrom, it is possible to arrive at new processes for the elimination or destruction of weeds, in lawns, crops, destruction of brush, or the like, even where susceptible vegetation grows immediately adjacent the areas to be treated.

I claim:
1. The tetrahydrofurfuryl ester of 4-chloro-2-methylphenoxyacetic acid.
2. A herbicidal composition containing as an active ingredient the tetrahydrofurfuryl alcohol ester of 4-chloro-2-methylphenoxyacetic acid, said ester being present in the composition in phytocidal concentration.
3. A composition as claimed in claim 2, wherein said ester is mixed with a hydrocarbon oil.
4. A composition as claimed in claim 2, wherein said ester is mixed with a wetting agent.
5. A process for the selective killing of weeds without substantial damage to surrounding desirable crops due to vapor drift, which comprises applying to said weeds the tetrahydrofurfuryl ester of 4-chloro-2-methylphenoxyacetic acid in an amount sufficient to kill the weeds.

References Cited in the file of this patent

UNITED STATES PATENTS

| | | |
|---|---|---|
| 2,390,941 | Jones | Dec. 11, 1945 |
| 2,543,397 | Allen | Feb. 27, 1951 |

OTHER REFERENCES

Science, 1948, pp. 278–279.